E. E. HARTMAN.
AIRPLANE.
APPLICATION FILED DEC. 24, 1919.
1,371,241.
Patented Mar. 15, 1921.
3 SHEETS—SHEET 1.
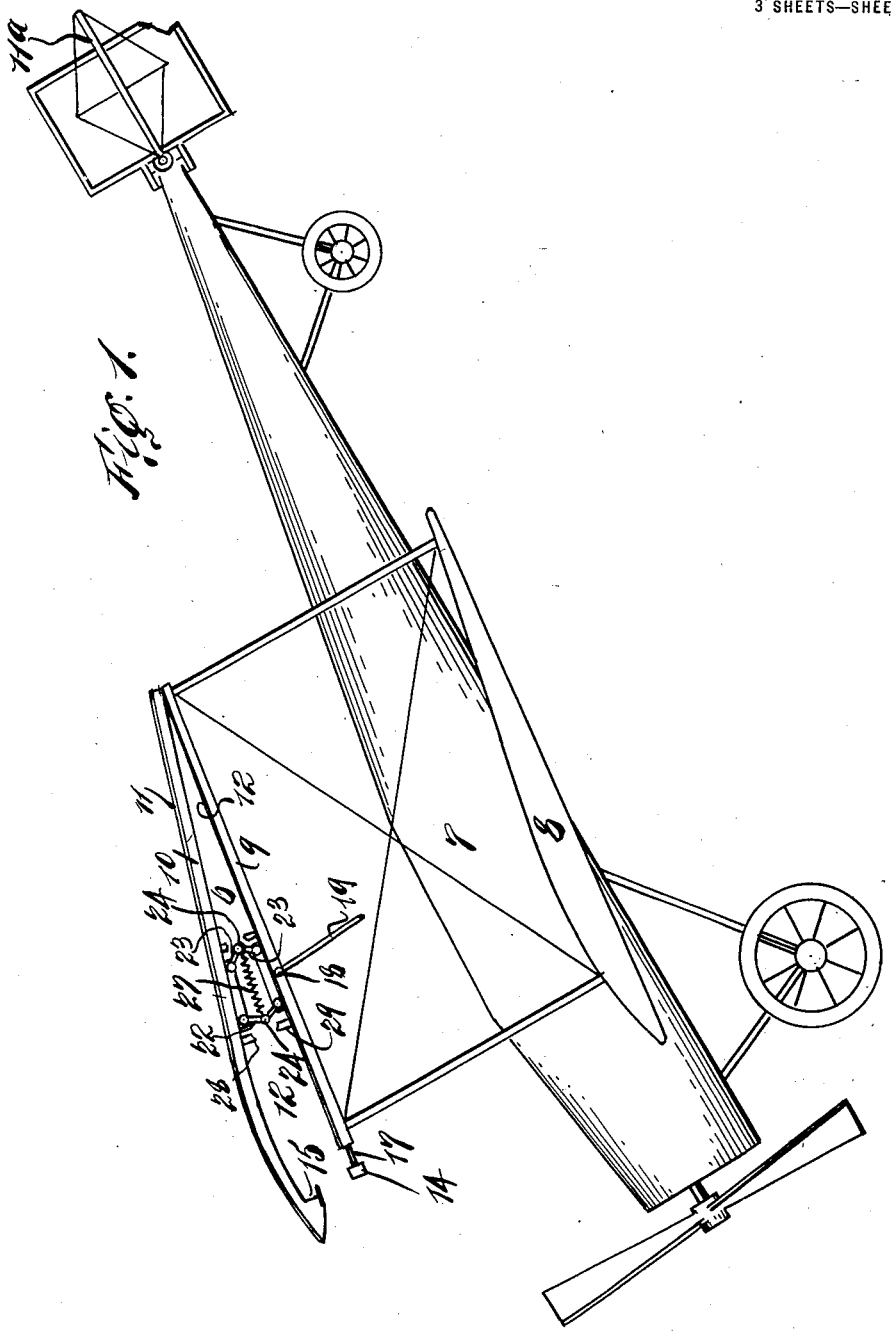
Inventor
Elles E. Hartman
By his Attorney E. E. HARTMAN.
AIRPLANE.
APPLICATION FILED DEC. 24, 1919.
1,371,241.
Patented Mar. 15, 1921.
3 SHEETS—SHEET 2.
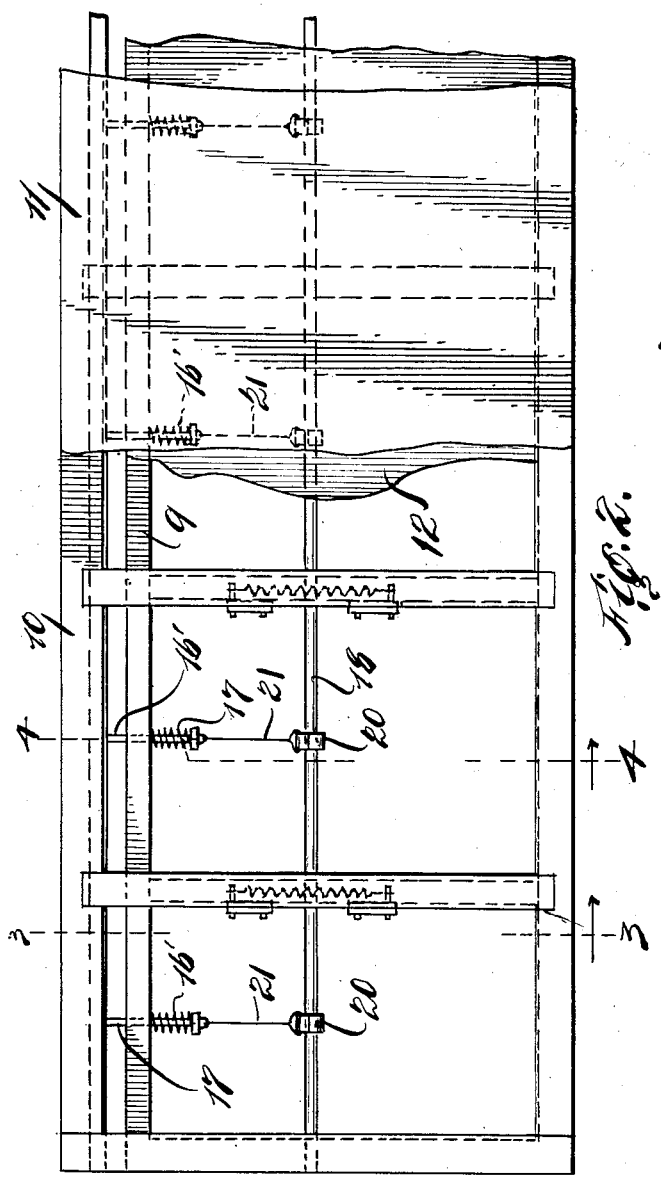
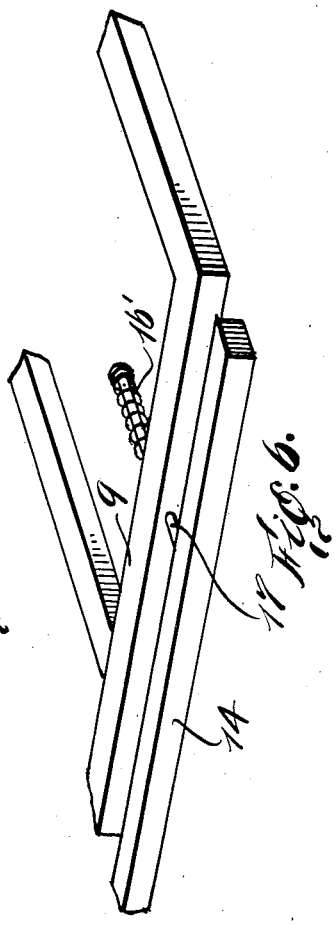
Inventor
Alles E. Hartman
By his Attorney

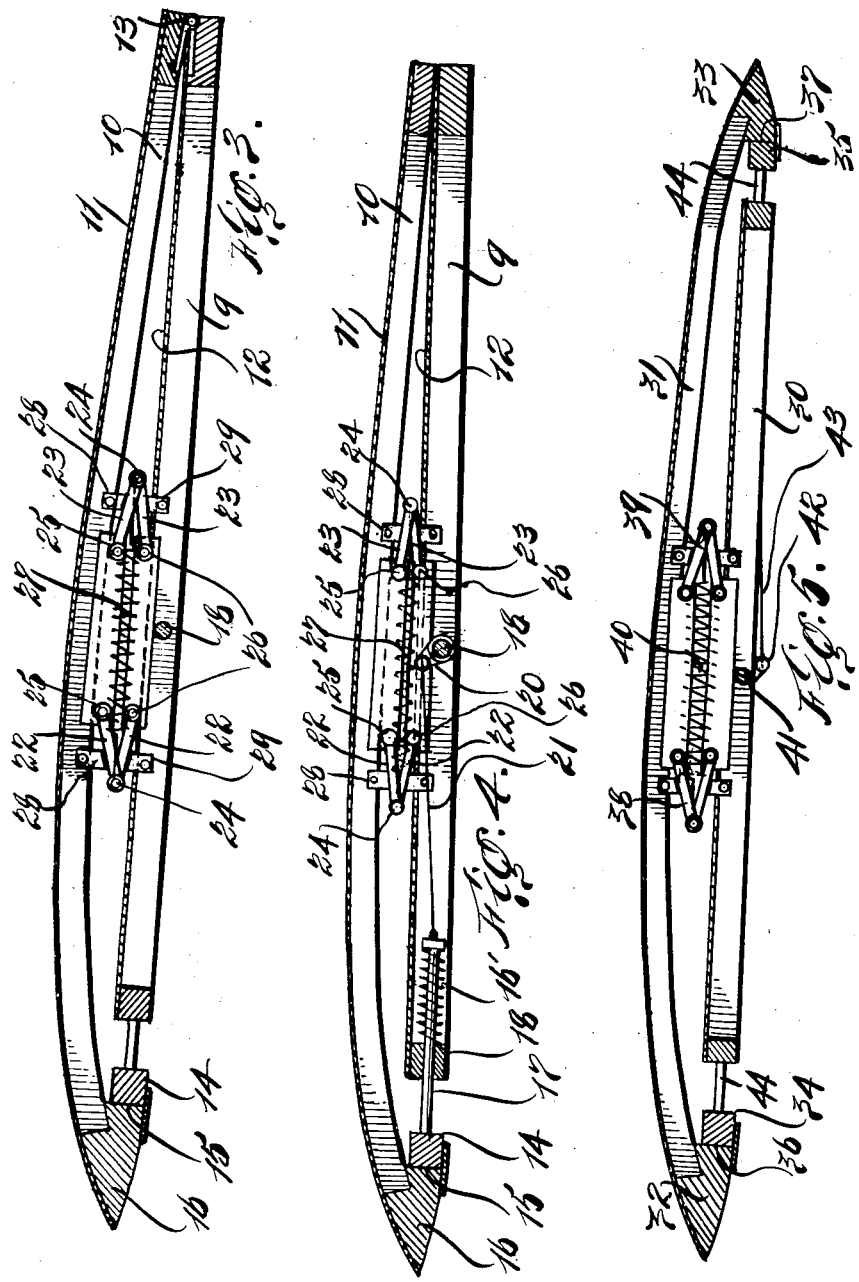

UNITED STATES PATENT OFFICE.

ELLÉS E. HARTMAN, OF NEW YORK, N. Y., ASSIGNOR OF ONE-THIRD TO ETHEL E. HARTMAN, OF NEW YORK, N. Y., AND ONE-THIRD TO ARTHUR P. CAMPBELL, OF WICHITA, KANSAS.

AIRPLANE.

1,371,241. Specification of Letters Patent. Patented Mar. 15, 1921.

Application filed December 24, 1919. Serial No. 347,151.

*To all whom it may concern:*

Be it known that I, ELLÉS E. HARTMAN, a citizen of Hungary, residing at New York city, county and State of New York, have invented certain new and useful Improvements in Airplanes, of which the following is a full, clear, and exact description.

This invention relates to improvements in airplanes and has for an object to provide means to lessen the dangers arising from a nose dive or the like. To accomplish this result, I have provided a device arranged in combination with the top wing of an airplane (should it be of the bi-plane type) to offer resistance in excess of the resistance offered to the wing itself, in fact I prefer to provide an especially designed wing to accomplish this result; in other words, a wing offering low resistance that can be transformed into a wing offering high resistance.

I will now proceed to describe my invention in detail, the novel features of which will be pointed out in the appended claims, reference being had to the accompanying drawing, wherein:—

Figure 1 illustrates a bi-plane in the position of a nose dive, my invention being also illustrated in connection therewith;

Fig. 2 is an enlarged fragmentary plan view of a portion of the top wing;

Figs. 3 and 4 are enlarged cross sectional views, taken on lines 3—3 and 4—4, respectively, in Fig. 1;

Fig. 5 is a cross sectional view of an alternate form of wing; and

Fig. 6 is a fragmentary perspective view of the frame of the fixed wing and latch carried thereby.

To carry my invention into practice, I provide a wing 6, in this instance, the top wing of a bi-plane, consisting of the fuselage or car 7, lower wings 8 (one only being shown in Fig. 1), and the said top wing 6. The top wing 6 comprises a fixed section 9 and a movable section 10, both of which are covered with canvas, indicated by 11 and 12, the covering 11 being applied to the movable section 10, the sections 9 and 10 being of approximately the same area. Under normal conditions, that is to say, when the plane is in flight, and all parts performing their functions properly, the sections 9 and 10 of the wing 6 will be positioned one against the other, as indicated in Figs. 3 and 4. While the parts 9 and 10 are positioned as above described, the wing 6 will not offer any undue resistance, but will act as an ordinary wing; in other words, it will offer minimum resistance. Should the plane take a nose dive, due, for instance, to the breakage or improper action of the tail planes 11 (one only being shown in Fig. 1), the movable section can be released from its locked position and moved to an angular position relative to the wing section 9, as indicated in Fig. 1, thereby forming a pocket 12 to contain or confine a volume of air. The formation of the pocket 12 will transform the wing having low resistance into a wing having high resistance, and will be similar in action to moving an open umbrella rapidly through the air. The high resistance offered by the formation of the pocket 12 will materially check the movement of the plane and will greatly lessen the danger incident to a nose or similar dive.

The movable section 10 is in this instance hinged at 13 to the section 9, at the rear end, and is held down against section 9 by a latch 14 which extends the full length of the section 9 and engages a channel 15 formed in the adjacent surface of the nose 16 of the plane section 10. The latch is maintained in engagement with the channel by springs 16' coiled about pins 17 passing loosely through the frame member 18. The spring acts to pull the pins outwardly, thereby forcing the latch into the channel 15. To operate the latch, I provide an oscillatory shaft 18 mounted in the frame of the plane section 9 and operate said shaft by a thereto attached lever 19 (Fig. 1), located adjacent the aviator's seat (not shown) in the fuselage 7.

In combination with said shaft 18, I provide same with arms 20 which are connected to pins 17 by wires 21. When shaft 18 is operated, in the proper direction, the latch 14 will be withdrawn and the wing section 10 moved up at the forward end to an angular position relative to section 9. To move the section 10 upwardly, I provide toggle-arms 22 and 23 connected together at 24 and to sections 9 and 10 at 25 and 26, respectively. The toggle arms are operated to move the section 10 upwardly by springs 27. To assist in closing the toggle-arms, I provide abutments 28 and 29 which also act to maintain said arms in proper relationship one with the other. To close the movable section or move it to normal position against section 9, it will be forced downwardly; said operation will be performed after the plane has landed.

Instead of hinging the sections, as stated, I may arrange same so that the movable section will be moved up clear of the lower section.

Fig. 5 illustrates a plane having a fixed section 30 and a movable section 31, said movable section being latched at both front and rear edges 32 and 33 to the fixed section 30. In this instance two latches 34 and 35 will be employed to engage channels 36 and 37, respectively, in the adjacent portions of the movable section 31. In this form the movable section will be raised by toggles 38 and 39 operated by springs 40. The latches 34 and 35 are operated by a shaft 41, arms 42 on said shaft, and wires 43 connecting the arms and pins 44 carrying the latches 34 and 35.

What I claim and desire to secure by Letters Patent is:—

1. In an airplane, a wing consisting of a plurality of superimposed sections, one of said sections being fixed, the other being movable relative to the fixed section, toggle arms connecting said sections, springs to actuate the toggle arms, to move the movable section, and means to releasably lock the sections together.

2. In an airplane, a fuselage, a wing carried thereby, consisting of a plurality of superimposed sections, one of said sections being fixed, the other movable, means to pivotally connect said sections along the rear longitudinal edges thereof, said movable section having a channel at the free longitudinal edge, a latch carried by the fixed plane along its free longitudinal edge and arranged to engage said channel and maintain said sections together, means operable by an aviator to actuate said latches to disconnect said sections, and automatic means to force the movable section upwardly when released from the fixed section.

3. In an airplane, a fuselage, a wing carried thereby, consisting of a plurality of superimposed sections, one of said sections being fixed, the other movable, means to pivotally connect said sections along the rear longitudinal edges thereof, said movable section having a channel at the free longitudinal edge, a latch carried by the fixed plane along its free longitudinal edge and arranged to engage said channel and maintain said sections together, means operable by an aviator to actuate said latches to disconnect said sections, toggles to force said sections apart when released, and springs to actuate the toggles.

Signed at New York city, N. Y., this 22 day of December, 1919.

ELLÉS E. HARTMAN.

Witnesses:
 MAURICE BLOCK,
 EDWARD A. JARVIS.